(12) United States Patent
Sakamoto et al.

(10) Patent No.: US 11,548,362 B2
(45) Date of Patent: Jan. 10, 2023

(54) VEHICLE BATTERY UNIT

(71) Applicant: HONDA MOTOR CO., LTD., Tokyo (JP)

(72) Inventors: Tetsuhisa Sakamoto, Saitama (JP); Hiroyuki Ozawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 367 days.

(21) Appl. No.: 16/872,710

(22) Filed: May 12, 2020

(65) Prior Publication Data

US 2020/0361301 A1 Nov. 19, 2020

(30) Foreign Application Priority Data

May 16, 2019 (JP) .............................. JP2019-093126

(51) Int. Cl.
*B60K 1/04* (2019.01)
*B60L 50/64* (2019.01)
(Continued)

(52) U.S. Cl.
CPC ................ *B60K 1/04* (2013.01); *B60L 50/64* (2019.02); *B60L 50/66* (2019.02); *H01M 50/20* (2021.01);
(Continued)

(58) Field of Classification Search
CPC ... B60K 1/04; B60K 2001/0438; B60L 50/64; B60L 50/68; H01M 50/298; H01M 50/249
See application file for complete search history.

(56) References Cited

U.S. PATENT DOCUMENTS 8,936,125 B2 * 1/2015 Nakamori ............... B60L 50/64
220/651
10,158,113 B2 * 12/2018 Fujii ..................... H01M 50/20
(Continued)

FOREIGN PATENT DOCUMENTS

CN 106240330 A 12/2016
JP H07-156826 A 6/1995
(Continued)

OTHER PUBLICATIONS

Apr. 20, 2022, Chinese Office Action issued for related CN Application No. 202010410584.5.
(Continued)

*Primary Examiner* — Katy M Ebner
(74) *Attorney, Agent, or Firm* — Paratus Law Group, PLLC (57) ABSTRACT

A vehicle battery unit comprising: a plurality of battery modules; an electric connection box; a battery control device configured to control the plurality of battery modules, a signal line extending from the electric connection box; a voltage detection line extending from the plurality of battery modules; and a battery case which accommodates the plurality of battery modules, the electric connection box, the battery control device, the signal line, and the voltage detection line. The battery control device includes: a first connector to which the signal line is connected on the one side in the front-rear direction; and a second connector to which the voltage detection line is connected on the other side in the front-rear direction. The battery control device is disposed above the plurality of battery modules and further on the one side than a center portion of the plurality of battery modules in the front-rear direction.

9 Claims, 6 Drawing Sheets

(51) Int. Cl.
  *H01M 50/20* (2021.01)
  *B60L 50/60* (2019.01)
  *H01M 50/502* (2021.01)

(52) U.S. Cl.
  CPC ... *H01M 50/502* (2021.01); *B60K 2001/0438* (2013.01); *H01M 2220/20* (2013.01)

(56) References Cited

U.S. PATENT DOCUMENTS

| | | |
|---|---|---|
| 2013/0192914 A1 | 8/2013 | Nakamori |
| 2014/0072835 A1 | 3/2014 | Tsujimura et al. |
| 2014/0232184 A1* | 8/2014 | Ukai .................. B60R 16/0215 307/10.1 |
| 2016/0141586 A1* | 5/2016 | Fujii .................. H01M 50/209 429/99 |
| 2018/0075996 A1* | 3/2018 | Narisawa ............... H01H 85/25 |
| 2018/0111483 A1* | 4/2018 | Nakayama ............. B60L 50/64 |
| 2019/0255929 A1* | 8/2019 | Nagano ................ H01M 50/20 |
| 2020/0079205 A1 | 3/2020 | Ohkuma et al. |
| 2020/0247225 A1* | 8/2020 | Kochi .................... B60L 50/64 |
| 2021/0129651 A1* | 5/2021 | Klomberg .............. B62D 21/15 |
| 2022/0048376 A1* | 2/2022 | Yamaguchi ............. B60L 50/66 |
| 2022/0080840 A1* | 3/2022 | Kawase ................... B60K 1/04 |
| 2022/0097510 A1* | 3/2022 | Yamamoto ............... B60K 1/04 |
| 2022/0153112 A1* | 5/2022 | Tatsuwaki ........... H01M 50/172 |

FOREIGN PATENT DOCUMENTS

| | | |
|---|---|---|
| JP | 2012-014963 A | 1/2012 |
| JP | 2012-243449 A | 12/2012 |
| JP | 2013-157242 A | 8/2013 |
| JP | 2015-079605 A | 4/2015 |
| JP | 2016-097700 A | 5/2016 |
| JP | 2016-192336 A | 11/2016 |
| JP | 2017-024481 A | 2/2017 |
| JP | 2018-046627 A | 3/2018 |
| JP | 2019-129042 A | 8/2019 |
| JP | 2020-037376 A | 3/2020 |

OTHER PUBLICATIONS

Apr. 27, 2021, Japanese Office Action issued for related JP application No. 2019-093126.

* cited by examiner

VEHICLE BATTERY UNIT

CROSS-REFERENCE TO RELATED APPLICATIONS

The present application claims the benefit of priority of Japanese Patent Application No. 2019-093126, filed on May 16, 2019, the content of which is incorporated herein by reference.

TECHNICAL FIELD

The present invention relates to a vehicle battery unit mounted on an electric vehicle or the like.

BACKGROUND ART

JP-A-2017-024481 describes a battery unit in which a plurality of battery modules and a battery ECU are accommodated in a case.

In recent years, the number of battery modules mounted on an electric vehicle has increased, and accordingly, the number of wires or the likes connected to a battery ECU has also increased. The wiring includes a voltage detection line extending from each battery module and a signal line extending from an electric connection box. Depending on the location of the battery ECU, those circuit paths become long.

SUMMARY

The invention provides a vehicle battery unit which can suppress an increase in length of a voltage detection line and a signal line.

According to an aspect of the invention, there is provided a vehicle battery unit including: a plurality of battery modules arranged at least two in a vehicle width direction and at least two in a front-rear direction of a vehicle; an electric connection box arranged on one side of the plurality of battery modules in the front-rear direction; a battery control device configured to control the plurality of battery modules, a signal line extending from the electric connection box; a voltage detection line extending from the plurality of battery modules; and a battery case which accommodates the plurality of battery modules, the electric connection box, the battery control device, the signal line, and the voltage detection line, wherein: the battery control device includes: a first connector to which the signal line is connected on the one side in the front-rear direction; and a second connector to which the voltage detection line is connected on the other side in the front-rear direction; and the battery control device is disposed above the plurality of battery modules and further on the one side than a center portion of the plurality of battery modules in the front-rear direction.

According to the invention, a signal line extending from an electric connection box can be shortened and voltage detection lines extending from a plurality of battery modules can be suppressed from becoming longer.

DESCRIPTION OF EMBODIMENTS

Hereinafter, an embodiment of a vehicle battery unit of the invention will be described with reference to the drawings. In addition, the drawings shall be viewed in the direction of reference letters, and in the following description, front and rear, left and right, up and down are described according to the direction viewed from an operator of a vehicle. In the drawings, the front of the vehicle is indicated by FR, the rear is indicated by Rr, the left side is indicated by L, the right side is indicated by R, the upper side is indicated by U, and the lower side is indicated by D.

Figure 1:
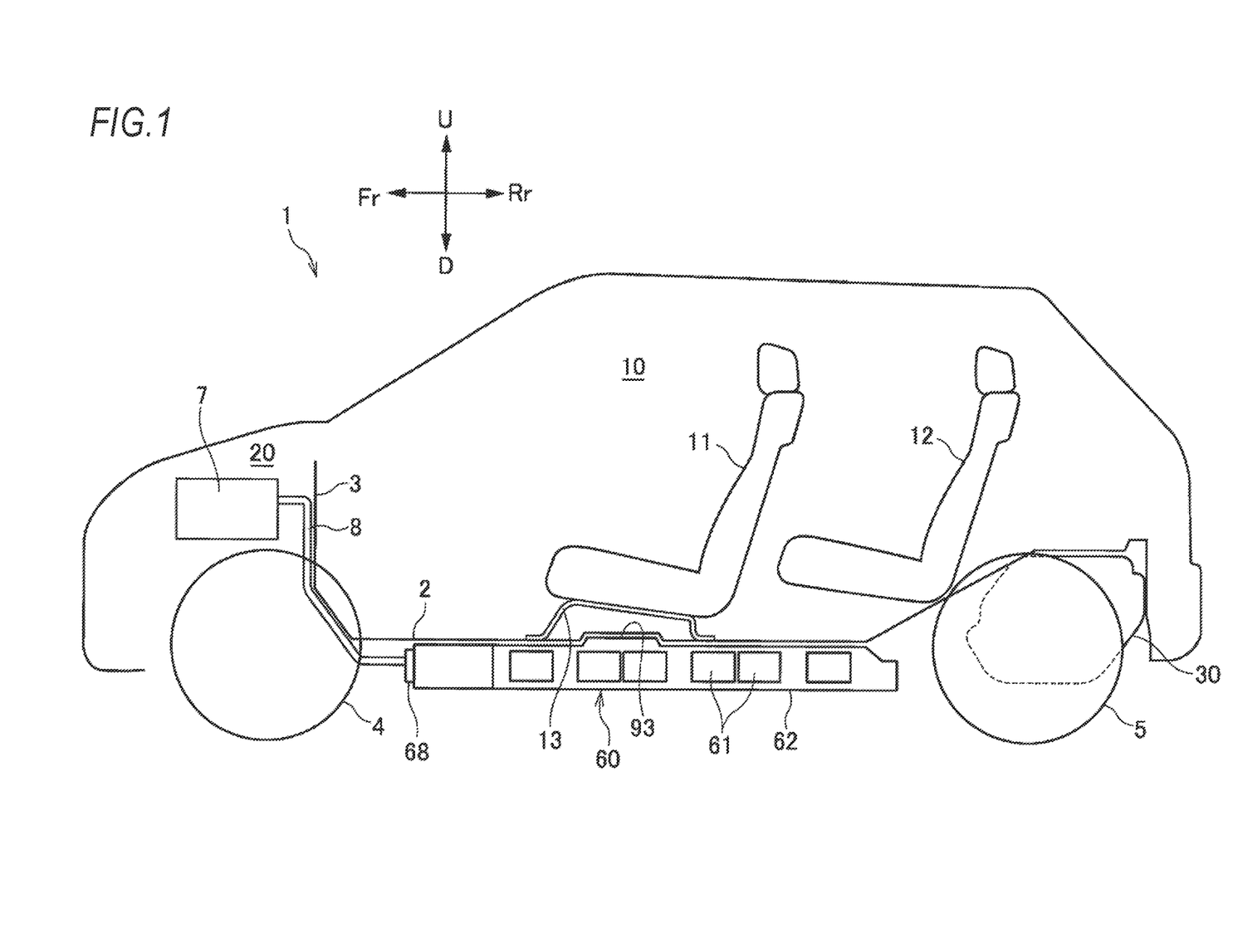
FIG. 1 is a schematic side view illustrating an entire structure of a vehicle on which a vehicle battery unit according to an embodiment of the invention is mounted.
Figure 2:
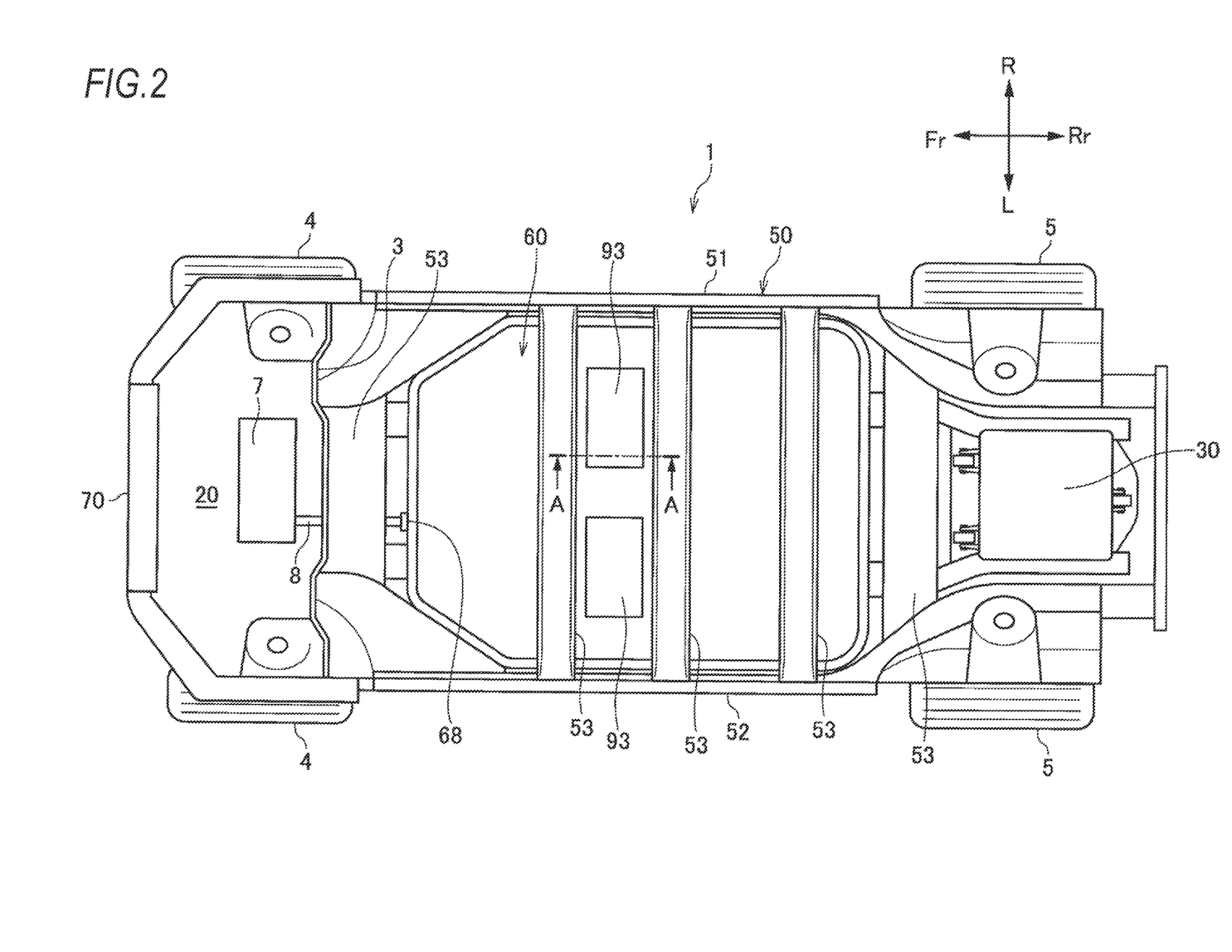
FIG. 2 is a plan view illustrating an underfloor structure of the vehicle in FIG. 1.

As illustrated in FIGS. 1 and 2, a vehicle 1 is defined by a floor panel 2 and a dash panel 3 into a cabin 10 and a front room 20 in front of the cabin 10. The cabin 10 is provided with a front seat 11 and a rear seat 12. A drive device unit 30 is provided below the floor panel 2 behind the rear seat 12. The drive device unit 30 drives left and right rear wheels 5. That is, in the vehicle 1, the left and right rear wheels 5 are used as drive wheels and left and right front wheels 4 are used as driven wheels.

Below the cabin 10, a battery unit 60 is arranged. The battery unit 60 is configured by accommodating a plurality of battery modules 61 in a battery case 62 and is arranged below the floor panel 2 in the cabin 10.

A vehicle body frame 50 includes a pair of left and right side sills 51 and 52 extending in a front-rear direction and a plurality of cross members 53 extending in a vehicle width direction (hereinafter, referred to also as a left-right direction) and connecting the side sills 51 and 52 to each other.

The drive device unit 30 includes an electric motor, a Power Control Unit (PCU) as an electric motor control device which controls the electric motor, and a power transmission mechanism which transmits the power of the electric motor to the rear wheels 5.

The front room 20 is provided with external components 7 such as an inverter for an air conditioner, an air conditioner ECU, a charger ECU, and a water temperature sensor. The external component 7 and the battery unit 60 are connected by an external harness 8 connected to a battery connector 68 provided on a front portion (a front wall portion 82F described below) of the battery unit 60.

Figure 3:
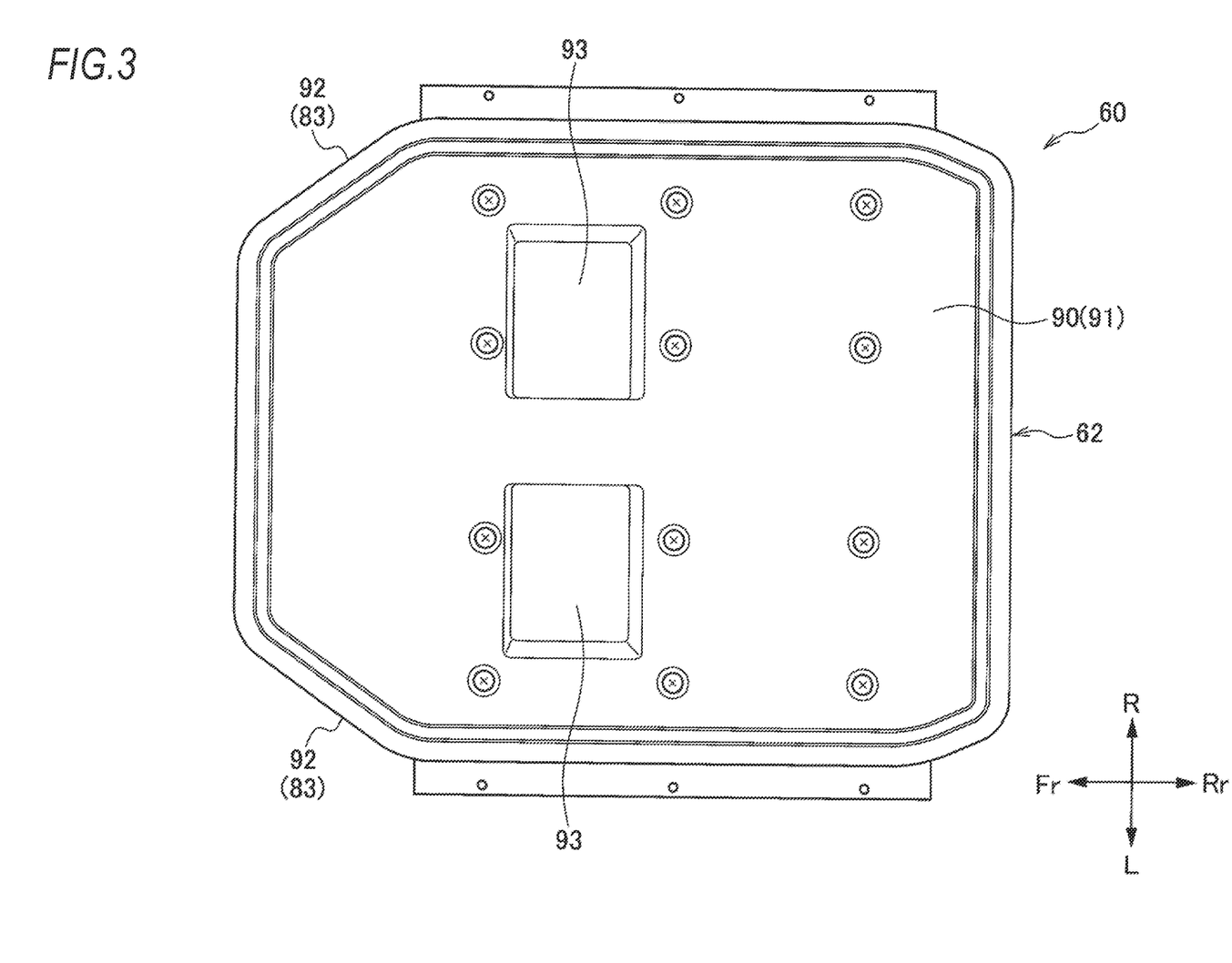
FIG. 3 is a plan view of the vehicle battery unit in FIG. 1.
Figure 4:
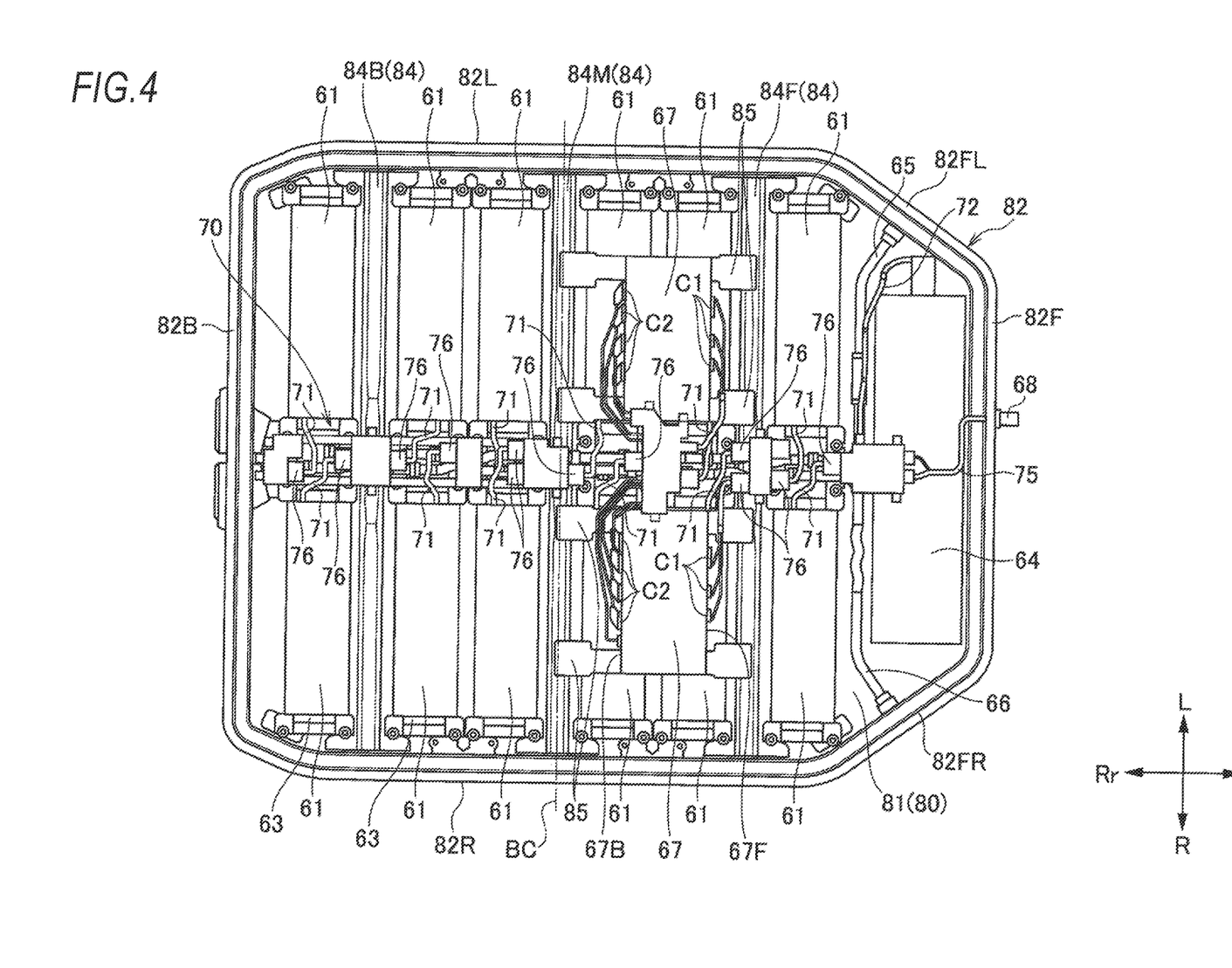
FIG. 4 is a plan view of the vehicle battery unit in FIG. 1 with a case lid portion removed.
Figure 6:
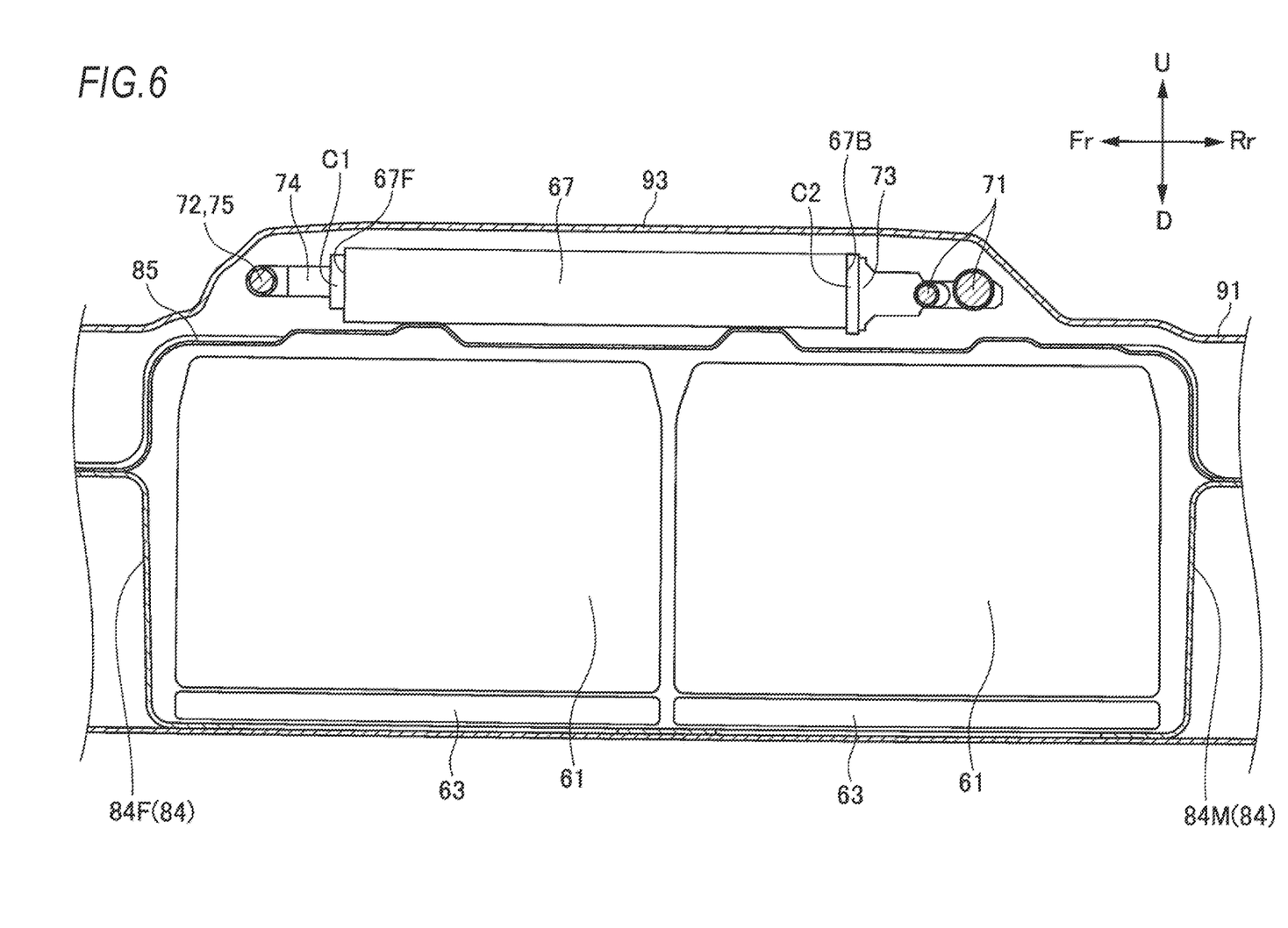
FIG. 6 is a cross-sectional view taken along the line A-A in FIG. 2.

As illustrated in FIGS. 3, 4, and 6, the battery unit 60 includes a plurality of battery modules 61, a battery cooling unit 63 for cooling the battery module 61, an electric connection box 64 arranged on the front side of the battery module 61, a battery control device 67 for controlling a plurality of battery modules 61, a supply pipe 65 for introducing a refrigerant from outside the battery case 62 to the battery cooling unit 63, a discharge pipe 66 for discharging the refrigerant from the battery cooling unit 63 to the outside of the battery case 62, and a battery case 62 accommodating the battery module 61, the battery cooling unit 63, the electric connection box 64, the battery control device 67, the supply pipe 65, and the discharge pipe 66.

As illustrated in FIG. 4, the plurality of battery modules 61 are arranged in the battery case 62 in the front-rear direction and the left-right direction. The battery unit 60 of the embodiment includes a total of twelve battery modules 61 arranged six in the front-rear direction and two in the left-right direction.

Each battery module 61 has a rectangular parallelepiped shape and is arranged so that the longitudinal direction is set to be parallel to the left-right direction and the transverse direction is set to be parallel the front-rear direction in a plan view. From each battery module 61, a voltage detection line 71 for detecting the voltage of each cell constituting the battery module 61 extends toward the center of the battery case 62 in the left-right direction.

Further, the voltage detection lines 71 extending from each battery module 61 may be put together with at least one temperature detection line for detecting the temperature of the battery module 61. The voltage detection line 71 extending from each battery module 61 is connected via a connector 76 to a cable unit 70 disposed between two battery modules 61 adjacent in the left-right direction and is unitized.

Figure 5:
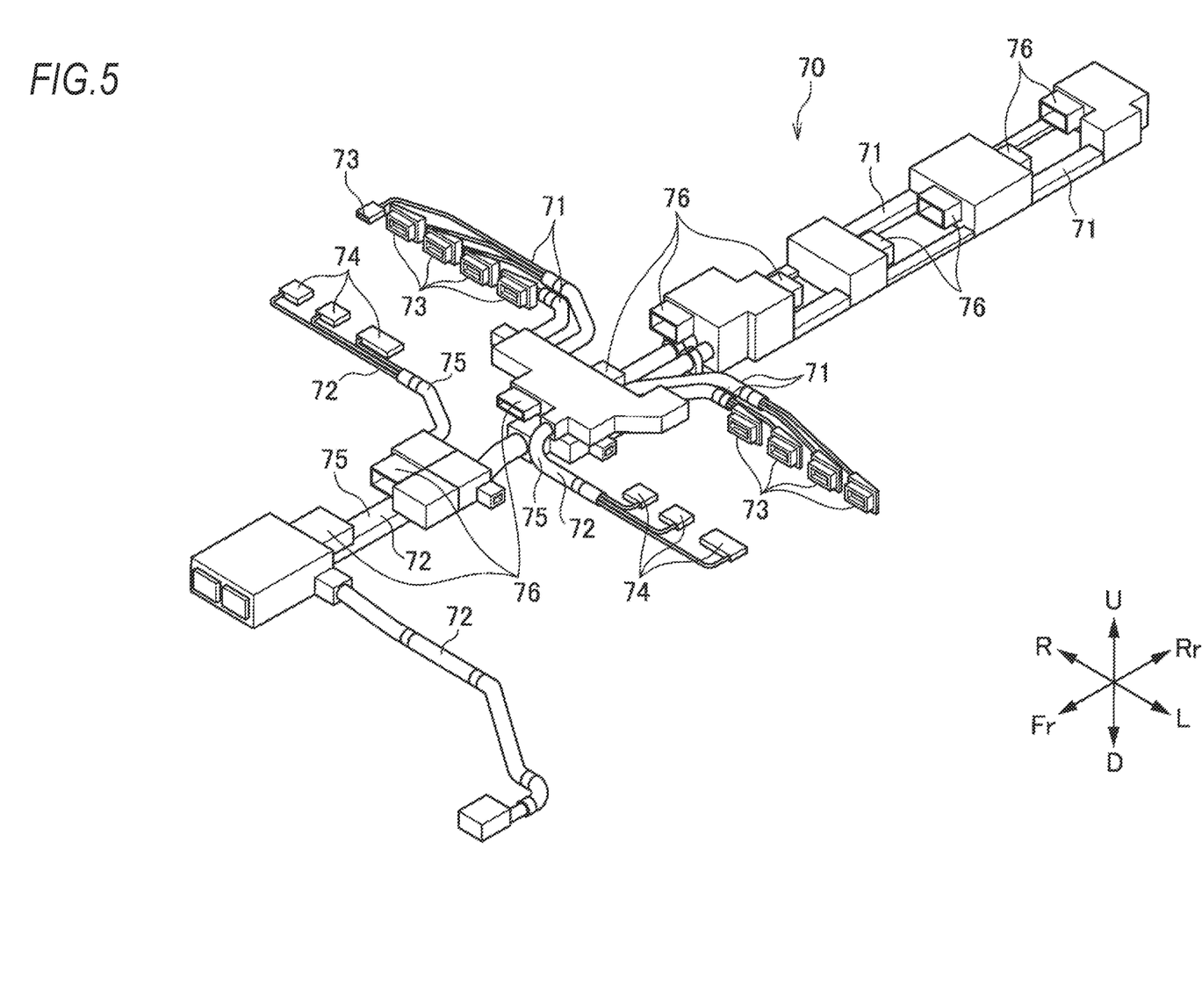
FIG. 5 is a perspective view of a cable unit in FIG. 4.

As illustrated in FIG. 5, the cable unit 70 is an aggregation of the voltage detection line 71 extending from each battery module 61 and a signal line 72 extending from the electric connection box 64. The cable unit 70 is arranged between two battery modules 61 adjacent to each other in the left-right direction and extends in the front-rear direction. The voltage detection line 71 is connected to the battery control device 67 via nine voltage detection connectors 73 located on the rear side. On the other hand, the signal line 72 is connected to the battery control device 67 via six power supply connectors 74 located on the front side. In the cable unit 70 of the embodiment, in addition to the voltage detection lines 71 and the signal lines 72, a signal line 75 extending from the battery connector 68 is also integrated. As described above, by integrating the voltage detection lines 71 and the signal lines 72 and 75 into the cable unit 70, the handling of wirings is improved.

As illustrated in FIG. 6, the battery cooling unit 63 is disposed below the battery module 61 and has a refrigerant passage through which the refrigerant passes. In the battery unit 60 of the embodiment, since one battery cooling unit 63 cools two battery modules 61 arranged in the left-right direction, six battery cooling units 63 arranged in the front-rear direction are provided.

The electric connection box 64 accommodates a contact for disconnecting and connecting a conductive path of battery power, a current sensor for detecting a current of the battery power, a ground fault detecting circuit for detecting a ground fault of the battery module 61, and the like. The electric connection box 64 of the embodiment is located on the front side of a pair of battery modules 61 arranged in the front row and arranged in the left-right direction. The left end of the electric connection box 64 is located inside the left end of the left battery module 61 and the right end of the electric connection box 64 is located inside the right end of the right battery module 61.

As illustrated in FIGS. 3 and 4, the battery case 62 includes a case body 80 accommodating the battery module 61, the battery cooling unit 63, the electric connection box 64, the supply pipe 65, and the discharge pipe 66 and a case lid portion 90 covering an upper opening of the case body 80.

The case body 80 includes a bottom portion 81, a side wall portion 82 rising from an outer edge of the bottom portion 81, and a flange portion 83 extending outward from the upper end of the side wall portion 82. The side wall portion 82 includes a left wall portion 82L and a right wall portion 82R facing each other in the left-right direction, a front wall portion 82F located on the front side of the electric connection box 64, a left inclined wall portion 82FL which connects the front wall portion 82F and the left wall portion 82L, a right inclined wall portion 82FR which connects the front wall portion 82F and the right wall portion 82R, and a rear wall portion 82B which connects rear ends of the left wall portion 82L and the right wall portion 82R, In the case body 80, three cross members 84 are extended in the left-right direction while being spaced apart in the front-rear direction. In the cross member 84, the center in the left-right direction is lower in height. When the three cross members 84 are sequentially referred to as a first cross member 84F, a second cross member 84M, and a third cross member 84B from the front, in the front-rear direction, the electric connection box 64 and the battery module 61 in the front row are arranged between the front wall portion 82F of the case body 80 and the first cross member 84F and the battery modules 61 in the second and third rows are arranged between the first cross member 84F and the second cross member 84M, and further the battery modules 61 in the fourth and fifth rows are arranged between the second cross member 84M and the third cross member 84B. In addition, a battery module 61 in the sixth row is arranged between the third cross member 84B and the rear wall portion 82B of the case body 80.

The case lid portion 90 includes a lid body portion 91 which covers the upper opening of the case body 80 and a flange portion 92 which extends outward from a peripheral edge of the lid body portion 91. The flange portion 92 is overlapped with the flange portion 83 of the case body 80 and fastened via a plurality of bolts.

As illustrated in FIGS. 4 and 6, the battery control device 67 is a battery ECU which controls a plurality of battery modules 61 and a pair of battery control devices 67 are provided on the left and right. Each battery control device 67 is supported by a pair of brackets 85 bridged between the first cross member 84F and the second cross member 84M and is disposed above the battery modules 61 in the second and third rows. By fixing the battery control device 67 by using the cross member 84, the battery control device 67 can be stably held. Further, the battery control device 67 is located forward of a center portion BC of the plurality of battery modules 61 in the front-rear direction.

As illustrated in FIGS. 1 to 3, the lid body portion 91 of the case lid portion 90 is provided with raised portions 93 which are upwardly convex at positions corresponding to the pair of left and right battery control devices 67 in a plan view. As illustrated in FIG. 6, at least a part of the battery control device 67 overlaps the raised portion 93 in a height direction. As a result, the raised portion 93 provided on the case lid portion 90 becomes an air pocket, and thus the battery control device 67 is less likely to be exposed to the water. In addition, as illustrated in FIG. 1, the raised portion 93 is located between seat rails 13 of the front seat 11 arranged in the cabin in the front-rear direction. Therefore, the space under the seat can be effectively used.

In the battery control device 67, first connectors C1 to which the signal lines 72 extending from the electric connection box 64 are connected are arranged in a front surface 67F of the battery control device 67 side by side in the left and right direction and second connectors C2 to which the voltage detection lines 71 extending from the plurality of battery modules 61 are connected are arranged in a rear surface 67B of the battery control device 67 side by side in the left-right direction.

A power supply connector 74, which is a connection portion of the signal lines 72 and 75, which are aggregated in the cable unit 70, is connected to the first connector C1 and a voltage detection connector 73, which is a connection portion of the voltage detection line 71 integrated in the cable unit 70, is connected to the second connector C2.

In this way, the battery control device 67 is arranged ahead of the center portion BC of the battery modules 61 and the first connector C1 to which the signal line 72 extending from the electric connection box 64 is connected is arranged in front of the battery control device 67. Therefore, the length of the signal line 72 can be shortened.

Also, since the second connectors C2 to which the voltage detection lines 71 extending from the plurality of battery modules 61 are connected are arranged behind the battery control device 67, the second connector C2 is located close to the center portion BC of the plurality of battery modules 61, so that the voltage detection line 71 can be suppressed from becoming longer.

Further, since the distance between the battery connector 68 provided in the front portion of the battery unit 60 and the first connector C1 is also short, the length of the signal line 72 can be shortened.

In addition, as illustrated in FIG. 6, the second connector C2 overlaps the raised portion 93 provided in the case lid portion 90 in the height direction. This makes it difficult for the second connector C2, which is a high-voltage connector, to be exposed to the water. In the embodiment, since the first connector C1 also overlaps with the raised portion 93 provided in the case lid portion 90 in the height direction, the first connector C1 is also less likely to be exposed to the water.

The embodiment described above can be appropriately modified, improved, and the like.

For example, in the embodiment, each battery control device 67 is indirectly fixed to two cross members 84 by a pair of brackets 85, but may be directly fixed to two cross members 84. In addition, it is not always necessary to be fixed to the two cross members 84 and it is sufficient if it is directly or indirectly fixed to at least one cross member 84.

In the embodiment, two battery control devices 67 are provided, but at least one battery control device is sufficient.

At least the following matters are described in this specification. In addition, although the corresponding components in the embodiment described above are shown in parentheses, the invention is not limited to this.

(1) A vehicle battery unit (battery unit 60) which includes a plurality of battery modules (battery modules 61) arranged at least two in a vehicle width direction and at least two in a front-rear direction of a vehicle, an electric connection box (electric connection box 64) arranged on one side of the plurality of battery modules in the front-rear direction, a battery control device (battery control device 67) for controlling the plurality of battery modules, a signal line (signal line 72) extending from the electric connection box, a voltage detection line (voltage detection line 71) extending from the plurality of battery modules, and a battery case (battery case 62) which accommodates the plurality of battery modules, the electric connection box, the battery control device, the signal line, and the voltage detection line, where the battery control device includes, a first connector (first connector C1) to which the signal line is connected on the one side in the front-rear direction, and a second connector (second connector C2) to which the voltage detection line is connected on the other side in the front-rear direction, and the battery control device is disposed above the plurality of battery modules and further on the one side than a center portion (center portion BC) of the plurality of battery modules in the front-rear direction.

According to (1), the battery control device is arranged further on one side in the front-rear direction than the center portion of the plurality of battery modules and the first connector to which the signal line extending from the electric connection box is connected is located on the one side. Therefore, the length of the signal line can be shortened. In addition, since the second connector to which the voltage detection lines extending from the plurality of battery modules are connected is arranged on the other side in the front-rear direction, the length of the voltage detection line can be suppressed from becoming increase.

(2) The vehicle battery unit according to (1), where the battery case includes at least one cross member (cross member 84) extending in the vehicle width direction, and the battery control device is directly or indirectly fixed to the at least one cross member so as to be located above the plurality of battery modules.

According to (2), the battery control device can be appropriately held by directly or indirectly fixing the battery control device to the cross member which is the vehicle skeletal member.

(3) The vehicle battery unit according to (1) or (2), where the battery case includes at least two cross members (cross members 84) arranged to be separated from each other in the front-rear direction and extending in the vehicle width direction, and the battery control device is directly or indirectly fixed to the adjacent two cross members (first cross member 84F and second cross member 84M) so as to be located above the plurality of battery modules.

According to (3), the battery control device can be stably held by directly or indirectly fixing the battery control device across two cross members adjacent in the front-rear direction.

(4) The vehicle battery unit according to (3), where a bracket is bridged between the two cross members, the two battery modules are arranged between the two cross members side by side in the front-rear direction, and the battery module has a substantially rectangular shape in a plan view and is arranged such that a transverse direction is set to be parallel to the front-rear direction.

According to (4), an increase in weight can be avoided by preventing the bracket from being lengthened.

(5) The vehicle battery unit according to any one of (1) to (4), where a part of the voltage detection line is disposed between the two battery modules adjacent in the vehicle width direction and extends in the front-rear direction.

According to (5), the voltage detection line can be integrated between two battery modules adjacent in the vehicle width direction.

(6) The vehicle battery unit according to (5), where a part of the signal line is disposed between the two battery modules adjacent in the vehicle width direction and extends in the front-rear direction, and a part of the voltage detection line and a part of the signal line are unitized.

According to (6), the voltage detection line and the signal line can be integrated between two battery modules adjacent to each other in the vehicle width direction and handling is improved by unitizing those.

(7) The vehicle battery unit according to any one of (1) to (6), where a case-side connector (battery connector 68) is provided on the one side of the battery case to connect an electric component (external component 7) of the vehicle and the battery control device.

According to (7), the battery control device is arranged further on one side in the front-rear direction than the center portion of the plurality of battery modules, and on the one side of the battery case, there is provided the case-side connector which connects the electrical component of the vehicle and the battery control device. Therefore, the length of the signal line in the battery case can be shortened.

(8) The vehicle battery unit according to any one of (1) to (6), where the battery case includes a case body (case body 80) and a cover (case lid portion 90) which seals an upper opening of the case body, the cover is provided with a raised portion (raised portion 93) which is convex upward, the battery control device is arranged in the raised portion in a plan view, and at least a part of the battery control device overlaps with the raised portion in a height direction.

According to (8), the raised portion provided on the cover becomes an air pocket, and thus the battery control device is less likely to be exposed to the water.

(9) The vehicle battery unit according to (8), where the second connector overlaps with the raised portion in the height direction.

According to (9), the second connector, which is a connector for high voltage, is less likely to be exposed to the water.

(10) The vehicle battery unit according to (8) or (9), where the battery case is located below a floor of the vehicle, and the raised portion is located between seat rails (seat rails 13) arranged in a cabin in the front-rear direction.

According to (10), by positioning the raised portion of the battery case between the seat rails, the space under the seat can be effectively used.

The invention claimed is:

1. A vehicle battery unit comprising:
   a plurality of battery modules arranged at least two in a vehicle width direction and at least two in a front-rear direction of a vehicle;
   an electric connection box arranged on one side of the plurality of battery modules in the front-rear direction;
   a battery control device configured to control the plurality of battery modules,
   a case-side connector configured to connect an electric component of the vehicle and the battery control device;
   a first signal line extending from the electric connection box and to a side of the battery control device that is closer to the electric connection box in the front-rear direction;
   a second signal line extending from the case-side connector and to the side of the battery control device that is closer to the electric connection box in the front-rear direction;
   a voltage detection line extending from the plurality of battery modules and to a side of the battery control device that is farther from the electronic connection box in the front-rear direction; and
   a battery case which accommodates the plurality of battery modules, the electric connection box, the battery control device, the first signal line, the second signal line, and the voltage detection line, wherein:
   the case-side connector is provided on the one side of the battery case;
   the battery control device includes:
      a first connector to which the first signal line and the second signal line are connected on the one side in the front-rear direction; and
      a second connector to which the voltage detection line is connected on another side that is opposite the one side in the front-rear direction; and
   the battery control device is disposed above the plurality of battery modules and further on the one side than a center portion of the plurality of battery modules in the front-rear direction.

2. The vehicle battery unit according to claim 1, wherein:
   the battery case includes at least one cross member extending in the vehicle width direction; and
   the battery control device is directly or indirectly fixed to the at least one cross member so as to be located above the plurality of battery modules.

3. The vehicle battery unit according to claim 1, wherein:
   the battery case includes at least two cross members arranged to be separated from each other in the front-rear direction and extending in the vehicle width direction; and
   the battery control device is directly or indirectly fixed to the adjacent two cross members so as to be located above the plurality of battery modules.

4. The vehicle battery unit according to claim 3, wherein:
   a bracket is bridged between the two cross members;
   the battery modules are arranged between the two cross members side by side in the front-rear direction; and
   each of the battery modules has a substantially rectangular shape in a plan view and is arranged such that a transverse direction is set to be parallel to the front-rear direction.

5. The vehicle battery unit according to claim 1, wherein a part of the voltage detection line is disposed between the two battery modules adjacent in the vehicle width direction and extends in the front-rear direction.

6. The vehicle battery unit according to claim 5, wherein:
   a part of the first signal line is disposed between the two battery modules adjacent in the vehicle width direction and extends in the front-rear direction; and
   a part of the voltage detection line and a part of the first signal line are unitized.

7. The vehicle battery unit according to claim 1, wherein:
   the battery case includes a case body and a cover which seals an upper opening of the case body;
   the cover is provided with a raised portion which is convex upward;
   the battery control device is arranged in the raised portion in a plan view; and
   at least a part of the battery control device overlaps with the raised portion in a height direction.

8. The vehicle battery unit according to claim 7, wherein the second connector overlaps with the raised portion in the height direction.

9. The vehicle battery unit according to claim 7, wherein:
   the battery case is located below a floor of the vehicle; and
   the raised portion is located between seat rails arranged in a cabin in the front-rear direction.

\* \* \* \* \*